United States Patent
Li et al.

(10) Patent No.: US 9,923,734 B2
(45) Date of Patent: *Mar. 20, 2018

(54) HOME BASE STATION SYSTEM AND DATA ACCESS PROCESSING METHOD THEREOF

(71) Applicant: INTERNATIONAL BUSINESS MACHINES CORPORATION, Armonk, NY (US)

(72) Inventors: Mingqiang Li, Beijing (CN); Jun Song Wang, Beijing (CN); Qing Wang, Beijing (CN); Chao Xue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,891

(22) Filed: Jun. 27, 2016

(65) Prior Publication Data

US 2016/0309450 A1 Oct. 20, 2016

Related U.S. Application Data

(63) Continuation of application No. 14/257,124, filed on Apr. 21, 2014, now Pat. No. 9,497,043.

(30) Foreign Application Priority Data

Apr. 28, 2013 (CN) .......................... 2013 1 0155685

(51) Int. Cl.
*H04L 12/64* (2006.01)
*H04W 72/04* (2009.01)
*H04W 84/04* (2009.01)

(52) U.S. Cl.
CPC ......... *H04L 12/6418* (2013.01); *H04W 72/04* (2013.01); *H04W 84/045* (2013.01)

(58) Field of Classification Search
CPC .............. H04W 24/04; H04W 40/246; H04L 41/0668; H04L 45/22
See application file for complete search history.

(56) References Cited

U.S. PATENT DOCUMENTS 8,121,600 B2    2/2012 Vakil et al.
8,254,368 B2    8/2012 Huber et al.
(Continued)

FOREIGN PATENT DOCUMENTS

WO    WO 2011/153504 A1    12/2011

OTHER PUBLICATIONS

Mustika, Wayan et al., "Potential game approach for self-organized interference management in closed access femtocell networks", Graduate School of Informatics, Kyoto University, 2011, pp. 1-5, IEEE.

(Continued)

*Primary Examiner* — Siming Liu
(74) *Attorney, Agent, or Firm* — Rabin Bhattacharya

(57) ABSTRACT

A home base station system and method for managing data caching. The home base station system includes: a plurality of home base stations used to provide wireless communication to at least one mobile terminal, wherein the plurality of home base stations are connected to a wide area network via a local area network, and wherein the plurality of home base stations are interconnected via a local area network; and a server, wherein the server is connected to the plurality of home base stations via the local area network, and wherein the server is used to manage caching of data in a home base station system.

9 Claims, 6 Drawing Sheets

(56) References Cited

U.S. PATENT DOCUMENTS

| | | | |
|---|---|---|---|
| 9,497,043 B2* | 11/2016 | Li | H04L 12/6418 |
| 2005/0102300 A1* | 5/2005 | Madsen | G06F 17/30902 |
| 2008/0132239 A1 | 6/2008 | Khetawat et al. | |
| 2008/0305792 A1 | 12/2008 | Khetawat et al. | |
| 2010/0128708 A1 | 5/2010 | Liu et al. | |
| 2012/0289222 A1 | 11/2012 | Venkatachalam | |
| 2012/0314692 A1 | 12/2012 | Tinnakornsrisuphap et al. | |
| 2013/0013726 A1* | 1/2013 | Westberg | H04L 67/2847 |
| | | | 709/213 |

OTHER PUBLICATIONS

Yun, Ji-Hoon et al., "CTRL: A Self-Organizing Femtocell Management Architecture for Co-Channel Deployment", Real-Time Computing Laboratory, EECS Department, University of Michigan, Sep. 20, 2010, p. 3, MobtCom 2010.

* cited by examiner

HOME BASE STATION SYSTEM AND DATA ACCESS PROCESSING METHOD THEREOF

CROSS-REFERENCE TO RELATED APPLICATION

This application is a continuation of U.S. patent application Ser. No. 14/257,124 filed on Apr. 21, 2014, which claims priority under 35 U.S.C. § 119 from Chinese Patent Application No. 201310155685.2 filed Apr. 28, 2013, the entire contents of which are incorporated herein by reference.

BACKGROUND OF THE INVENTION

1. Field of the Invention

The present invention relates to the field of wireless communication, and more specifically, to a data access processing method and system in home base stations.

2. Description of the Related Art

As Internet is immerged into people's life and with the development of the 3G/4G wireless network, there is an increasing demand for broadband applications, and people wish to get multimedia services such as music and video through a cell phone at anytime and anywhere. The increasing audio/video applications put a heavy pressure on the bandwidth of the mobile network.

The emergence of a home base station such as femtocell largely relieves this pressure on the bandwidth of the mobile network. A femtocell is a small, low-power cellular mobile base station typically used in a home or small business. Unlike a macro cellular base station which uses optical fiber or wireless transmission, a femtocell employs IP protocol and is connected to public IP network via broadband circuit connections such as existing ADSL, LAN, and at remote end, connectivity from IP network to mobile network is realized by a dedicated gateway. It is applicable to many mobile standards and uses same format and frequency range as other mobile base stations of the operator, thus can be commonly used by mobile terminals such as cell phones. Each femtocell can support several users.

However, with development of home base station technology, network bandwidth consumption of public IP network becomes larger and larger, and how to effectively reduce bandwidth of public IP network consumed by home base stations has become a new problem in the industry.

Therefore, what is desired is to provide a solution capable of reducing network bandwidth consumption introduced into public IP network by home base stations.

SUMMARY OF THE INVENTION

The present invention provides a home base station system including: a plurality of home base stations used to provide wireless communication to at least one mobile terminal, wherein the plurality of home base stations are connected to a wide area network via a local area network, and wherein the plurality of home base stations are interconnected via the local area network; and a server, wherein the server is connected to the plurality of home base stations via the local area network, and wherein the server is used to manage caching of data in a home base station system.

According to another aspect of the present invention, there is provided a server used in a home base station system, including: an internal transmission module for communicating with a home base station via a local area network; and a caching management module for managing caching of data in the home base station system; wherein the home base station system includes a plurality of home base stations and a server connected via the local area network, and wherein the plurality of home base stations are used to provide wireless communication to at least one mobile terminal.

According to another aspect of the present invention, there is provided a method for processing data access in a home base station system, the method including: receiving a data access request from a serving home base station in a plurality of home base stations, wherein the data access request is issued to a server by a serving home base station in response to receiving the data access request from a mobile terminal, and wherein the data request includes a data identifier of data requested by the mobile terminal; determining a home base station caching the data as a target home base station according to the data identifier; and transmitting, in response to determining the target home base station, an identifier of the target home base station to the serving home base station, so as to provide data cached at the target home base station to the mobile terminal; wherein the home base station system includes the plurality of home base stations and a server connected via a local area network; and wherein the home base stations are used to provide wireless communication to at least one mobile terminal.

DETAILED DESCRIPTION OF THE PREFERRED EMBODIMENTS

Figure 1:
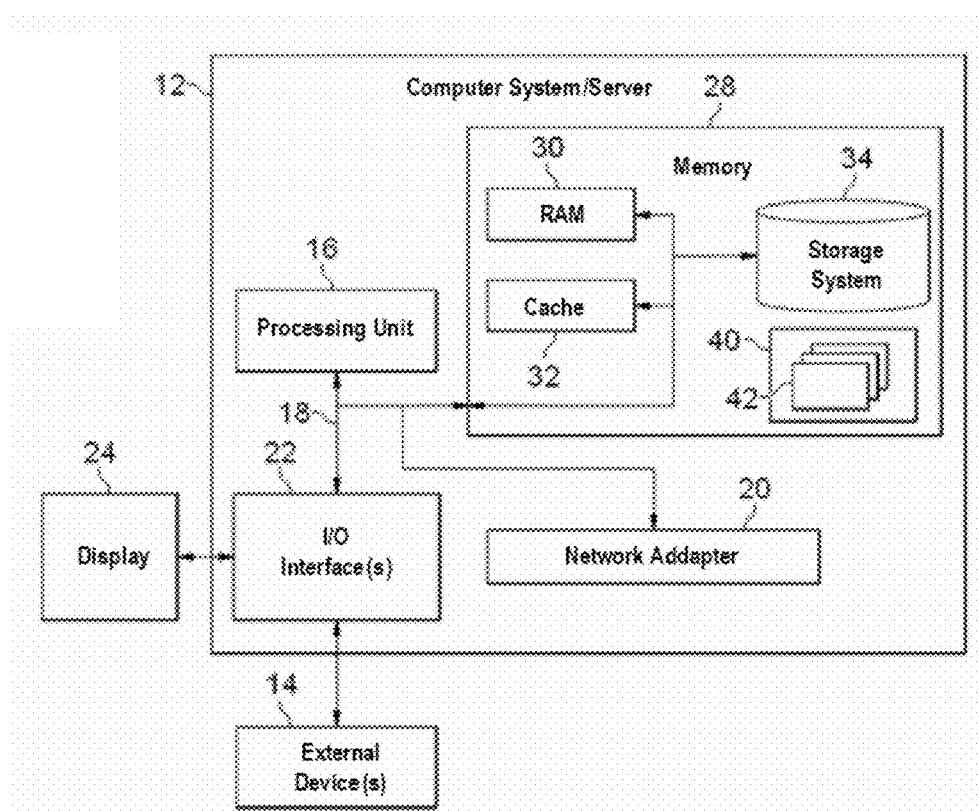
FIG. 1 shows a block diagram of an exemplary computer system/server which is applicable to implement the embodiments of the present invention.

According to other aspects of the present invention, there is provided a method for processing data access in a home base station system, wherein the home base station system includes a plurality of home base stations and a server connected via a local area network, the home base stations are used to provide wireless communication to at least one mobile terminal, the method including: receiving a data request from a serving home base station in the plurality of home base stations, the data access request is issued to the server by the serving home base station in response to receiving a data access request from a mobile terminal, wherein the data request includes data identifier of data requested by the mobile terminal; determining whether the data is cached in a global cache of the server according to the data identifier; in response to determining that the data is cached in the global cache of the server, transmitting the data to the serving home base station, so as to provide the data to the mobile terminal by the serving home base station.

According to another aspect of the present invention, there is provided an apparatus for processing data access in a home base station system, wherein the home base station system includes a plurality of home base stations and a server connected via a local area network, the home base stations are used to provide wireless communication to at least one mobile terminal, the apparatus includes implementing each of steps in methods of the invention.

With the method, apparatus and system of the invention, network bandwidth consumption introduced into public IP network by home base stations is effectively reduced.

Through the more detailed description of some embodiments of the present invention in the accompanying drawings, the above and other objects, features and advantages of the present invention will become more apparent, wherein the same reference generally refers to the same components in the embodiments of the present invention.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to; an electronic; magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments according to the present invention will be described below with reference to accompany drawings. It should be noted that, for ease of description, embodiments of the invention are described by taking implementation of femtocell as an example, however, those skilled in the art will appreciate that, embodiments of the invention are not only applicable to femtocell, rather, they are applicable to any small base station capable of being interconnected through manner of local area network. That is to say, in the context of the present invention, the concept of home base station encompasses any small base station capable of being interconnected via a local area network.

Figure 2:
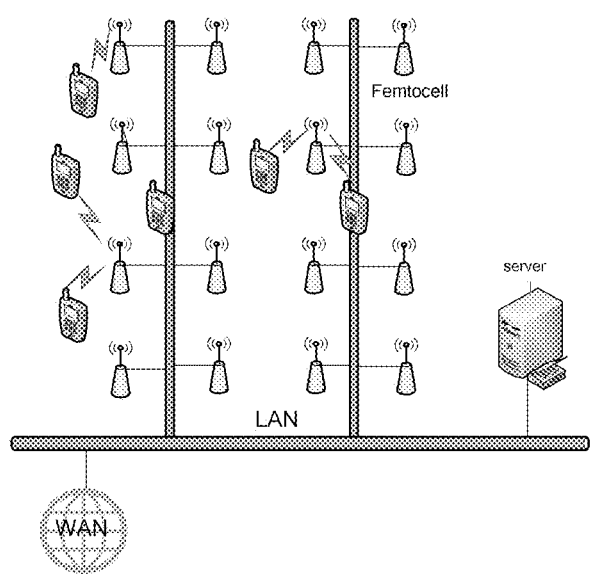
FIG. 2 shows a diagram of a home base station system according to an embodiment of the present invention.

FIG. 2 shows a diagram of a home base station system according to an embodiment of the present invention. The home base station system includes a plurality of home base stations and a server, in which the home base stations are used to provide wireless communication to at least one mobile terminal, for example, in the form of femtocell. The plurality of home base stations are connected to a wide area network (such as public IP network) via a local are network (LAN) and the local area network is used to interconnect the plurality of home base stations and to interconnect the server and the plurality of home base stations. A mobile terminal can be connected to a home base station via the local area network to request desired data. And the server manages caching of data in the home base station system.

Each home base station can include an internal transmission module and an external transmission module. The internal transmission module is used to transfer data among each of home base stations and between home base stations and the server; the external transmission module is used to transfer data between home base stations and a backbone network, i.e. WAN.

According to an embodiment of the invention, a home base station can include a local cache for storing data that can be requested by a mobile terminal. In this way, after a home base station serving a mobile terminal (i.e. a serving home base station) receives a data access request from the mobile terminal, it first searches its local cache to determine whether the requested data is stored in its local cache. If yes, the serving home base station returns data stored in its local cache to the mobile terminal. If the requested data has not been found in local cache of the serving home base station, the serving home base station sends a data access request to the server to make the server determine whether the data is stored in a home base station within the home base station system.

According to an embodiment of the invention, the server can include a caching management module for managing caching of data in the home base station system. The server can further include a caching directory for recording information about data stored in local caches of the plurality of home base stations. In this way, by using data identifier (such as audio name or video name) of the requested data contained in a data querying request, the server can, by querying its caching directory, determine whether the data is stored in a home base station within that home base station system. After a corresponding home base station, i.e. a target home base station, has been found, the server transmits identifier of that target home base station as a response back to the serving home base station, so as to provide data cached at that target home base station to the mobile terminal.

According to another embodiment of the invention, the server can include therein a global cache for caching data needed in the home base station system. Each home base station, after receiving a data access request of a mobile terminal, transmits the data access request to the server via the local area network for the server to query its global cache and transmit the queried data to the corresponding home base station via the local area network, so as to provide the data to the mobile terminal. If the data is not found in the server, then the corresponding serving home base station can acquire the data via the wide area network and transmit the data to the server to store in its global cache for future use. In this case, there is no need to provide a local cache in each of the home base stations.

Figure 3:
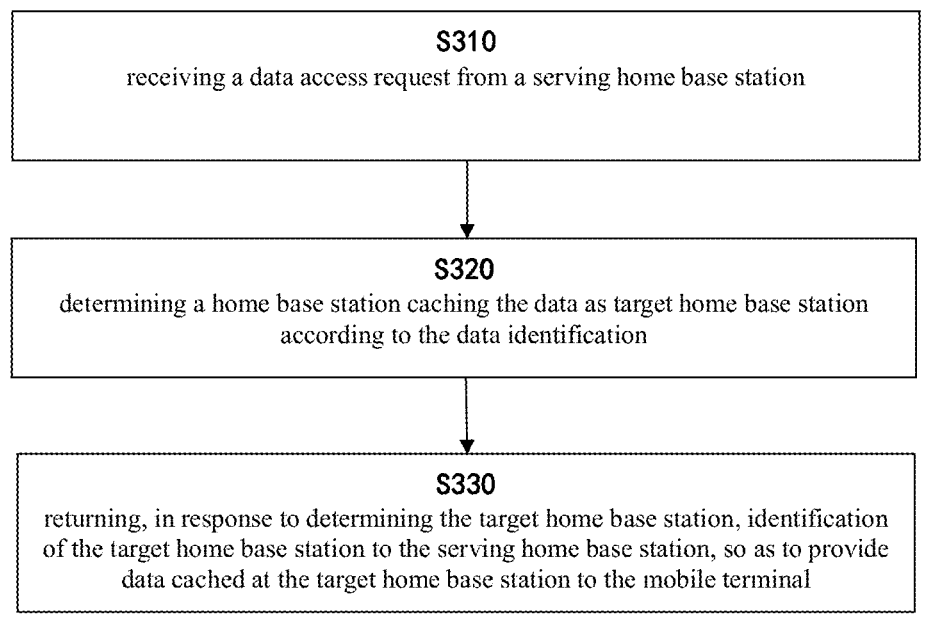
FIG. 3 shows a diagram of a method for processing data access in a home base station system according to an embodiment of the present invention.

FIG. 3 shows a diagram of a method for processing data access in a home base station system according to an embodiment of the present invention, in which the home base station system has an architecture as shown in FIG. 2, and includes a plurality of home base stations and a server connected via the local area network.

In step S310, a data access request from a serving home base station is received. The data access request is sent to the server by the serving home base station in response that a data access request from a mobile terminal is received and the data is not contained in the local cache of the serving home base station. The data access request includes data identifier of data requested by the mobile terminal. Here, the requested data can be audio data, video data, or any other type of data that can be requested by a mobile terminal.

When a home base station, i.e. a serving home base station, receives the data access request from a mobile terminal, the serving home base station determines whether the requested data is stored in its local cache. If the requested data is contained in its local cache, the serving home base station can directly transmit the data to that mobile terminal. If the requested data is not contained in the local cache of the serving home base station, the serving home base station will send a data access request to the server to determine whether the data is stored in the home base station system where the serving home base station is located.

In step 320, a home base station caching the data is determined by the server as a target home base station according to the data identifier. The caching management module in the server selects a target home base station containing the data according to data identifier of the requested data.

According to an embodiment of the invention, the server can include therein a caching directory module for storing location information of the cached data in the home base station system. For example, the location information can be identifier information of a home base station caching the data. The caching management module determines a home base station caching the data as a target home base station according to a query to the caching directory.

In step S330, in response that the target home base station is determined, the identifier of the target home base station is returned to the serving home base station, so as to provide data cached at the target home base station to the mobile terminal.

After the identifier of the target home base station caching the desired data is acquired, the data cached at that target home base station can be provided to the mobile terminal in many different ways.

According to an embodiment of the invention, after receiving identifier of the target home base station, the serving home base station can acquire the requested data from that target home base station via the local area network according to the acquired identifier of the target home base station, cache the data at local and provide the data to the mobile terminal.

Alternatively, according to another embodiment of the present invention, the location of the mobile terminal in a home base station system can make it being connected to a plurality of home base stations in the home base station system, thus the mobile terminal can acquire data from different home base stations. In this case, the serving home base station can provide the acquired identifier of target home base station to the mobile terminal, and the mobile terminal accordingly switches from the serving home base station to the target home base station, so as to acquire the requested data from the target home base station. Further, to avoid the case that the target home base station found by the server is one to which the mobile terminal could not be connected, when the requested data is not contained in the local cache of the serving home base station to which the mobile terminal is connected, the serving home base station can send a "cache miss" message to the mobile terminal. In this way, the mobile terminal can accordingly generate a list of accessible home base stations, which includes identifiers of home base stations to which the mobile terminal can be connected, and transmits the list to the serving home terminal. The serving home terminal transmits the list to the server, such that the server can find a home base station, which the mobile terminal can be connected to and caches the requested data, as the target home base station based on the list of accessible home base stations.

Further, in the method shown in FIG. 3, if the server could not find a target home base station caching the requested data, then the serving home base station acquires the data requested to be accessed via the wide area network and provides the data to the mobile terminal. At the same time, the serving home base station can store the acquired data into its local cache for future use.

With the method described with reference to FIG. 3, data can be collaboratively cached within the entire home base station system, which reduces bandwidth consumption of public IP network by home base stations.

Since home base stations are accessed via public IP network, access to their data will be limited for purpose of security. Thus, according to another embodiment of the invention, the server can provide therein an access mode management module for determining access mode of data cached in the home base station system, for example, whether only a specific mobile terminal can access the data. After the server receives a data access request from a serving home base station, it determines, through the access mode management module, a list of home base stations to which the mobile terminal can be connected as candidates for a target home base station.

According to another embodiment of the invention, the server can also provide a neighbor list management module for providing a list of home base stations currently available in the home base station system. For example, in case that each home base station is controlled by a different family or individual, some home base stations sometimes can not be currently available, for example, being powered off, etc. At this time, a target home base station can be selected only from available home base stations through the list provided by the neighbor list management module.

According to another embodiment of the invention, the server can also provide a flow load analyzing module for analyzing uplink flow load condition of each home base station and selecting a home base station with low uplink flow load as the target home base station, so as to avoid adding further data transmission task onto a home base station whose flow load has already been very high.

According to another embodiment of the invention, the server can also provide an interference management module for selecting a home base station with higher transmission quality as the target home base station by comparing interference information of each home base station.

It should be noted that, the above described modules such as the access mode management module, the neighbor list management module, the flow load analyzing module, and the interference management module are merely provided for improving caching management performance of the server, and these are not modules necessary to implement the server and the home base station system of the present invention. These modules can work separately or be used together to cooperatively select a target home base station.

Embodiments of the invention have been described above with reference to FIG. 3 from perspective of steps implemented by a server. Two embodiments of the methods for implementing the invention will be illustratively described below with reference to FIG. 4 and FIG. 5 from perspective of the entire home base station system, respectively.

Figure 4:
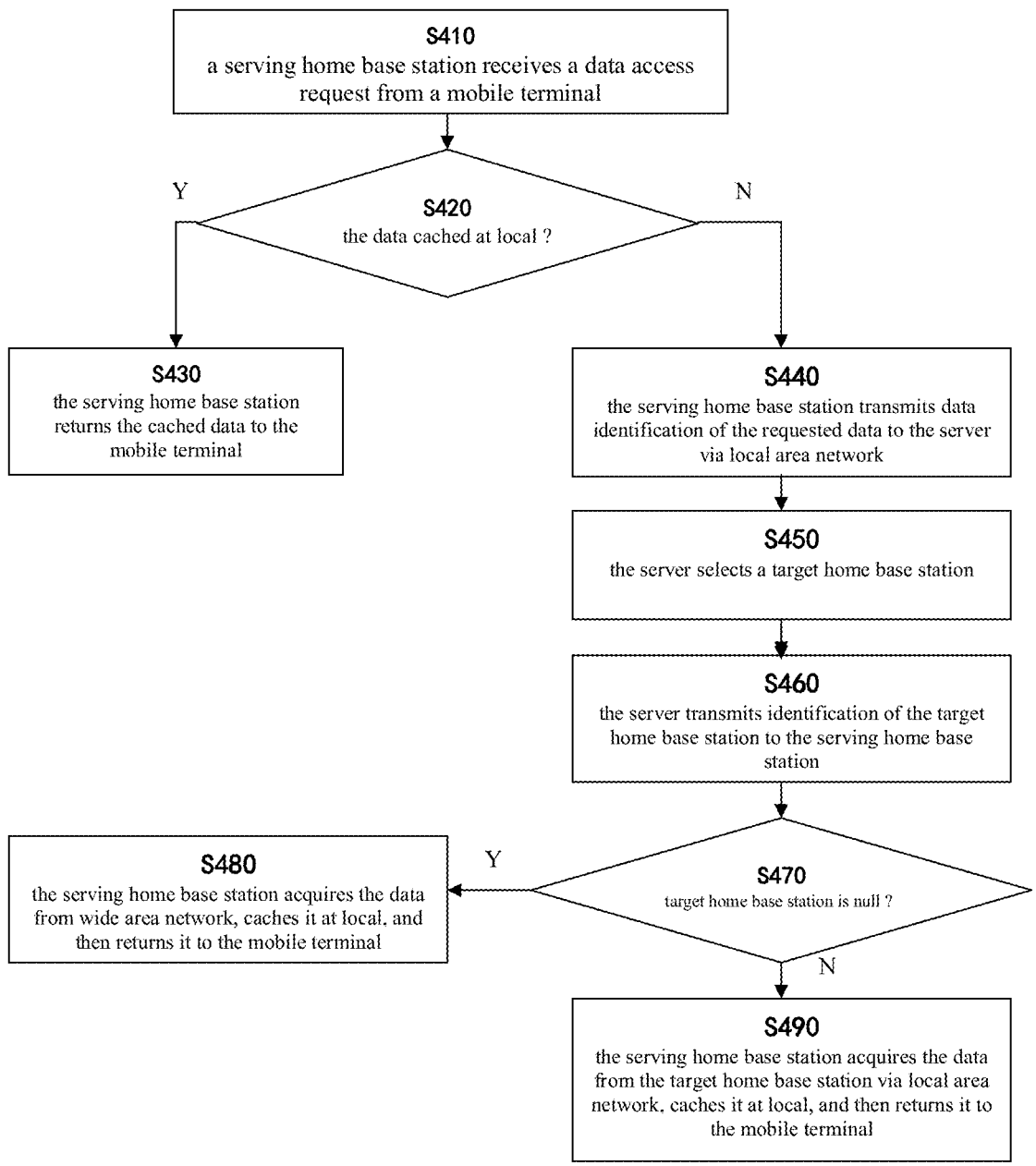
FIG. 4 shows a diagram of a method for processing data access in a home base station system according to an embodiment of the present invention.

First, as shown in FIG. 4, in step S410, a serving home base station receives a data access request from a mobile terminal. In step S420, it determines whether the requested data is cached in the local cache of the serving home base station. If yes, the method proceeds to S430, where the serving home base station returns the cached data to the mobile terminal. If no, the method proceeds to S440, where the serving home base station transmits data identifier of the requested data to the server via the local area network. The data identifier can be the requested audio name or video name etc.

In step S450, the server selects a target home base station. According to an embodiment of the invention, the server can select a list of target home base stations through an access mode management module. The list of target home base stations includes all home base stations allowed to be accessed by the mobile terminal. Then, a caching directory module in the server selects a target home base station containing the requested data from the list of target home base stations.

According to an embodiment of the invention, a flow load analyzing module in the server can also analyze uplink flow load of each home base station and select a target home base station with low uplink flow load.

It should be noted that, the access mode management module, the caching directory module, and the flow load analyzing module can be used separately, or they can work together to select an appropriate target home base station.

In step S460, the server transmits identifier of the target home base station to the serving home base station.

In step S470, it is determined whether the target home base station is NULL, that is, whether there is no target home base station caching the data. If yes, the method proceeds to step S480, where the serving home base station acquires the data from the wide area network, caches the data at local, and then returns the data to the mobile terminal. If no, the method proceeds to step S490, where the serving home base station acquires the data from the target home base station via the local area network, caches the data at local, and then returns the data to the mobile terminal.

Figure 5:
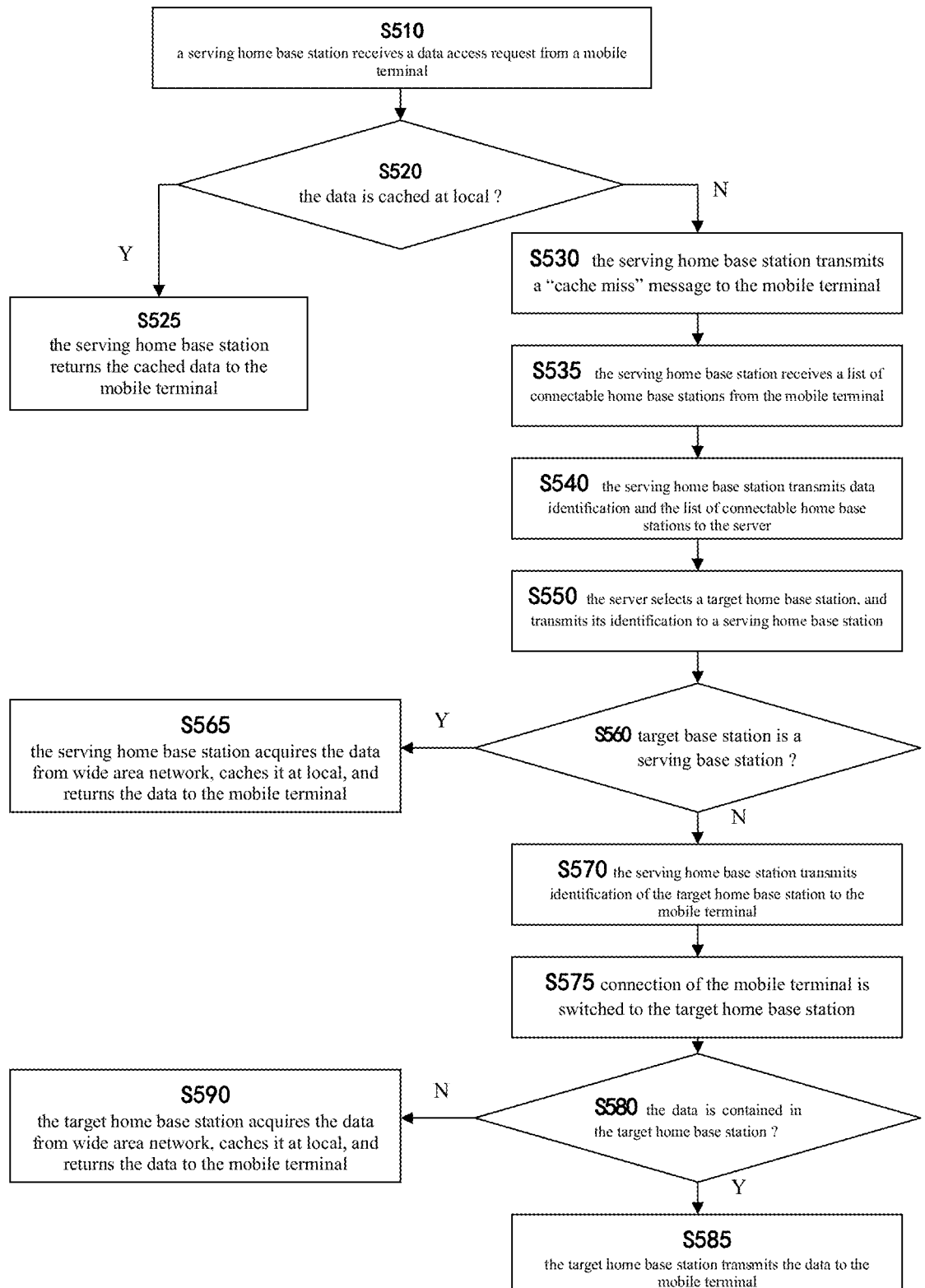
FIG. 5 shows a diagram of a method for processing data access in a home base station system according to embodiments of the present invention.

Another embodiment according to a method of the present invention is described below with reference to FIG. 5. As shown in FIG. 5, in step S510, a serving home base station receives a data access request from a mobile terminal. In step S520, it is determined whether the requested data is found in local cache of the serving home base station. If yes, the method proceeds to S525, where the serving home base station returns the cached data to the mobile terminal.

If no, the method proceeds to S530, where the serving home base station transmits a "cache miss" message to the mobile terminal.

In step S535, a list of accessible and connectable home base stations is received from the mobile terminal, wherein, the list of home base stations is transmitted by the mobile terminal in response to the "cache miss" message of the serving home base station, and it includes identifier of home base stations in the home base station system to which the mobile terminal can be connected.

It should be noted that, according to another embodiment of the invention, the mobile terminal can also transmit its list of accessible and connectable home base stations to the serving home base station along with the data access request, regardless of whether the requested data exists in the local cache of the serving home base station. Thus, step S535 and step S510 can be merged and step S530 is not needed. In case that the serving home base station fails to find the requested data in its local cache, the method directly proceeds to the following steps.

In step S540, the serving home base station transmits data identifier and the list of accessible and connectable home base stations to the server through an internal transmission module.

In step S550, the server selects a target home base station, and transmits its identifier to a serving home base station currently connected to the mobile terminal.

According to an embodiment of the invention, the server can select a list of target home base stations through an access mode management module and a neighbor list management module. The list contains therein all home base stations capable of being accessed by the mobile terminal and currently in available state. The server can select a target home base station from the list of target home base stations through its caching directory module. For that target home base station, it can be analyzed by a flow analysis module that its uplink flow load is not high and it can be learned form an interference management module that its interference is not high.

According to an embodiment of the invention, if the requested data is cached in a home base station included in the list of home base stations, then that home base station is returned as the target home base station, otherwise, a home base station with optimal cache hit history can be selected as the target home base station.

In step S560, it is determined whether the target home base station is a home base station currently connected to the mobile terminal, a serving base station; if yes, the method proceeds to step S565, where the serving home base station acquires the data from the wide area network through an external transmission module, caches it at local, and returns the data to the mobile terminal.

If no, the method proceeds to step S570, where the serving home base station transmits identifier of the target home base station to the mobile terminal. In step S575, connection of the mobile terminal is switched to the target home base station. In step S580, it is determined whether the data is contained in the target home base station. If yes, the method proceeds to step S585, where the target home base station returns the data to the mobile terminal. If no, the method proceeds to step S590, where the target home base station acquires the data from the wide area network through an external transmission module, caches it at local, and returns the data to the mobile terminal.

According to an embodiment of the invention, the server can include a global cache. Thus, after the server receives a data request from a serving home base station, the server determines whether the data is cached in the global cache of the server according to the data identifier. Furthermore, in response to the determination that the data is cached in the global cache of the server, the server transmits the data to the serving home base station to make the serving home base station provide the data to the mobile terminal. If the data is not found in the global cache, the serving home base station acquires the data requested to be accessed via the wide area network, provides the data to the mobile terminal, and transmits the data to the server at the same time, which caches the data in the global cache for future use.

Figure 6:
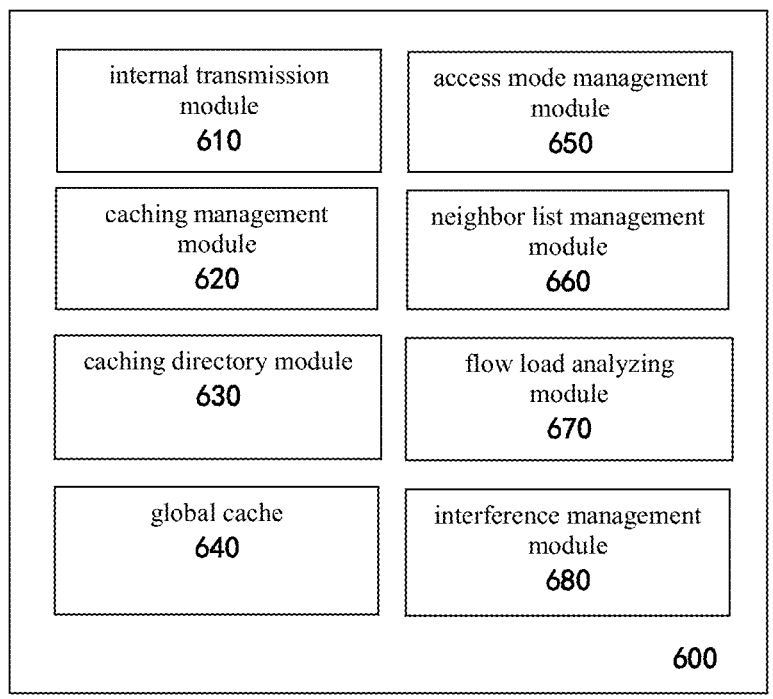
FIG. 6 shows a diagram of a server in a home base station according to an embodiment of the present invention.

FIG. 6 shows a diagram of a server in a home base station system according to embodiments of the present invention. The server 600 can include an internal transmission module 610 for communicating with home base stations via the local area network, and a caching management module 620 for managing caching of data in the home base station system.

According to an embodiment of the invention, the server 600 can further include a caching directory module 630 for recording information about data stored in local cache of the plurality of home base stations.

The caching management module 620 determines a target home base station storing the data according to a data access request from a serving home base station and transmits identifier of the target home base station to the serving home base station via the internal transmission module 610.

According to an embodiment of the invention, the server 600 can further include a global cache 640. The caching management module 620 retrieves the data from the global cache 640 according to a data access request from a serving home base station and transmits the data to the serving home base station via the internal transmission module 610.

According to an embodiment of the invention, there is also provided an apparatus for processing data access in a home base station system, wherein the home base station system includes a plurality of home base stations and a server connected via a local area network, and the home base stations are used to provide wireless communication to at least one mobile terminal. The apparatus includes: a receiving means configured to receive a data access request from a serving home base station in a plurality of home base stations, the data access request is issued to the server by the serving home base station in response to receiving a data access request of a mobile terminal, wherein the data request includes data identifier of data requested by the mobile terminal; a caching managing means configured to determine a home base station caching the data as target home base station according to the data identifier; a transmitting means configured to, in response to determining the target home base station, return identifier of the target home base station to the serving home base station, so as to provide data cached at the target home base station to the mobile terminal.

According to an embodiment of the invention, after receiving identifier of the target home base station, the serving home base station provides the identifier of the target home base station to the mobile terminal, the mobile terminal switches from the serving home base station to the target home base station and the data is provided to the mobile terminal by the target home base station.

According to an embodiment of the invention, the receiving means further receives a list of accessible home base stations of the mobile terminal from the serving home base station, wherein the list of accessible home base stations contains identifier of home base stations to which the mobile terminal can be connected, wherein, the caching managing means further determines home base stations caching the data to which the mobile terminal can be connected as target home base station according to the list of accessible home base stations.

According to an embodiment of the invention, wherein the serving home base station acquires the requested data from the target home base station according to the identifier of the target home base station and provides the data to the mobile terminal.

According to an embodiment of the invention, the server includes a caching directory module for recording information about data stored in local cache of the plurality of home base stations, wherein the caching managing means determines a home base station caching the data as target home base station by querying the caching directory module.

According to an embodiment of the invention, in response to failing to determine a target home base station, the serving home base station acquires data requested to be accessed via the wide area network and provides the data to the mobile terminal.

According to an embodiment of the invention, there is also provided an apparatus for processing data access in a home base station system, wherein the home base station system includes a plurality of home base stations and a server connected via a local area network, the home base stations are used to provide wireless communication to at least one mobile terminal.

The apparatus includes: a receiving means configured to receive a data request from a serving home base station in the plurality of home base stations, the data access request is issued to the server by the serving home base station in response to receiving a data access request of a mobile terminal, wherein the data request includes data identifier of data requested by the mobile terminal; a caching managing means configured to determine whether the data is cached in global cache of the server according to the data identifier; a transmitting means configured to, in response to determining that the data is cached in global cache of the server, transmit the data to the serving home base station, so as to provide the data to the mobile terminal by the serving home base station.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A home base station system, comprising:
   a plurality of home base stations used to provide wireless communication to at least one mobile terminal, wherein the plurality of home base stations are connected to the mobile terminal; and
   a server, wherein the server is connected to the plurality of home base stations;
   wherein a serving home base station in the plurality of home base stations receives a data access request from a mobile terminal and transmits the data access request to the server;
   wherein the server determines a target home base station storing data according to the data access request from the serving home base station; and
   wherein the server transmits an identifier of the target home base station to the serving home base station.

2. The home base station system according to claim 1, wherein the plurality of home base stations include local caches.

3. The home base station system according to claim 2, wherein a serving home base station in the plurality of home base stations transmits data stored in a local cache to a mobile terminal after receiving a data access request from the mobile terminal.

4. The home base station system according to claim 1, wherein the serving home base station acquires data requested to be accessed from the target home base station via a local area network and transmits acquired data to the mobile terminal.

5. The home base station system according to claim 1, wherein the serving home base station transmits the identifier of the target home base station to the mobile terminal, and the mobile terminal switches to the target home base station and acquires data requested to be accessed from the target home base station.

6. The home base station system according to claim 1, wherein:
   the server includes a global cache;
   a serving home base station in the plurality of home base stations receives a data access request from a mobile terminal and transmits the data access request to the server; and
   the server retrieves data from the global cache according to the data access request from the serving home base station and transmits the data to the serving home base station.

7. A server used in a home base station system, wherein the home base station system comprises a plurality of home base stations and the home base stations are used to provide wireless communication to at least one mobile terminal, the server comprising:
   an internal transmission module for communicating with each of the home base stations;
   an external transmission module for communicating with each of the home base stations and a backbone network; and
   a caching management module for managing caching of data in the home base station system, wherein the caching management module determines a target home base station storing data according to a data access request from a serving home base station and transmits an identifier of the target home base station to the serving home base station via the internal transmission module.

8. The server according to claim 7, further comprising: a caching directory module for recording information about data stored in local caches of the plurality of home base stations.

9. The server according to claim 7, wherein the serving home base station acquires the data from the wide area network through the external transmission module, caches it at local, and returns the data to the mobile terminal.

* * * * *